United States Patent
Yasueda et al.

(10) Patent No.: US 11,450,905 B2
(45) Date of Patent: Sep. 20, 2022

(54) BATTERY PACK

(71) Applicant: TOYOTA JIDOSHA KABUSHIKI KAISHA, Toyota (JP)

(72) Inventors: Kengo Yasueda, Toyota (JP); Motoki Miyazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 16/729,877

(22) Filed: Dec. 30, 2019

(65) Prior Publication Data

US 2020/0227795 A1    Jul. 16, 2020

(30) Foreign Application Priority Data

Jan. 14, 2019    (JP) .............................. JP2019-003981

(51) Int. Cl.
*H01M 10/613*    (2014.01)
*H01M 10/48*    (2006.01)
(Continued)

(52) U.S. Cl.
CPC ..... *H01M 10/613* (2015.04); *H01M 10/0413* (2013.01); *H01M 10/0468* (2013.01); *H01M 10/482* (2013.01); *H01M 10/625* (2015.04)

(58) Field of Classification Search
CPC ............. H01M 10/613; H01M 10/482; H01M 10/625; H01M 10/0468; H01M 10/0413;
(Continued)

(56) References Cited

U.S. PATENT DOCUMENTS 9,166,262 B2 * 10/2015 Souki .................. H01M 50/258
2010/0151309 A1 * 6/2010 Marukawa ........ H01M 10/6557
429/120

(Continued)

FOREIGN PATENT DOCUMENTS

| CN | 103597653 A | 2/2014 |
| CN | 105990625 A | 10/2016 |
| JP | 2014-519180 A | 8/2014 |

OTHER PUBLICATIONS

Direct Plastics Limited. "How Engineering Plastics Expand with Temperature." Mar. 1, 2018, www.directplastics.co.uk/about-plastics/how-engineering-plastics-expand-with-temperature. (Year: 2018).*

*Primary Examiner* — Maria Laios
*Assistant Examiner* — Adam J Francis
(74) *Attorney, Agent, or Firm* — Sughrue Mion, PLLC

(57) ABSTRACT

Provided is a battery pack including a rectangular parallelepiped first battery module having a first air intake surface, and a rectangular parallelepiped second battery module having a second air intake surface. A cooling air flow passage chamber is formed between the first air intake surface and the second air intake surface. The battery pack includes a one-side wall and an other-side wall that are interposed between the first air intake surface and the second air intake surface and seal the cooling air flow passage chamber from a third direction. The one-side wall and the other-side wall are formed so as to be able to expand and contract in a first direction while maintaining the cooling air flow passage chamber in a sealed state.

6 Claims, 15 Drawing Sheets

(51) Int. Cl.
*H01M 10/625* (2014.01)
*H01M 10/04* (2006.01)

(58) Field of Classification Search
CPC .. H01M 50/20; H01M 10/0168; H01M 10/04; H01M 10/48
See application file for complete search history.

(56) References Cited

U.S. PATENT DOCUMENTS

| | | | |
|---|---|---|---|
| 2011/0206968 A1* | 8/2011 | Nishimura | H01M 10/613 429/120 |
| 2014/0072856 A1* | 3/2014 | Chung | B60L 3/0046 429/120 |
| 2016/0285142 A1 | 9/2016 | Kimura | |
| 2019/0299812 A1* | 10/2019 | Du | H01M 6/5038 |

* cited by examiner

BATTERY PACK

INCORPORATION BY REFERENCE

The disclosure of Japanese Patent Application No. 2019-003981 filed on Jan. 14, 2019 including the specification, drawings and abstract is incorporated herein by reference in its entirety.

BACKGROUND

1. Technical Field

The present disclosure relates to a battery pack including a plurality of battery modules each having a plurality of batteries.

2. Description of Related Art

There are known battery packs containing a plurality of battery modules each having a plurality of batteries. Among such battery packs is one in which a first battery module with a rectangular parallelepiped outer shape and a second battery module with a rectangular parallelepiped outer shape are disposed next to each other, such that a first air intake surface of the first battery module through which cooling air is taken into the module and a second air intake surface of the second battery module through which cooling air is taken into the module are opposite to each other, so as to form a cooling air flow chamber for cooling air to flow through between the first air intake surface and the second air intake surface. Examples of related arts include the battery pack described in Published Japanese Translation of PCT application No. 2014-519180 (see FIG. 2 etc. of this literature). The direction in which the first battery module and the second battery module are disposed next to each other will be referred to as an array direction (first direction).

SUMMARY

There are dimensional variations in the dimension in the array direction (first direction) among the first battery modules and among the second battery modules. Therefore, when module blocks are each formed by disposing a first battery module and a second battery module next to each other in the array direction so as to leave a constant clearance between the first battery module and the second battery module, dimensional variations in the dimension in the array direction also occur among these module blocks. When such dimensional variations in the dimension in the array direction (the dimension in the first direction) occur among module blocks, manufacturing facilities that handle the module blocks in the manufacture of battery packs are required to be adapted to such dimensional variations, which is likely to make the manufacturing facilities expensive. Pack cases to house the module blocks are also required to be adapted to the dimensional variations. It is therefore desirable to reduce the dimensional variations in the dimension in the array direction (the dimension in the first direction) among the module blocks.

Having been contrived in view of this situation, the present disclosure provides a battery pack that can reduce dimensional variations in the dimension in the array direction (the dimension in the first direction) among module blocks each having a first battery module and a second battery module disposed next to each other in the array direction (first direction).

One aspect of the present disclosure to solve the above problem is a battery pack including a plurality of battery modules each having a plurality of batteries. This battery pack includes: a first battery module with a rectangular parallelepiped outer shape that has a first air intake surface which faces one side in a first direction and extends in a second direction orthogonal to the first direction and through which cooling air is taken into the module; and a second battery module with a rectangular parallelepiped outer shape that is disposed on the one side of the first battery module in the first direction, next to the first battery module, and has a second air intake surface which is opposite to the first air intake surface, faces the other side in the first direction, and extends in the second direction and through which the cooling air is taken into the module. Between the first air intake surface of the first battery module and the second air intake surface of the second battery module, a cooling air flow passage chamber is formed which extends in the second direction along the first air intake surface and the second air intake surface and in which the cooling air flows from one side toward the other side in the second direction while flowing into the first battery module through the first air intake surface and flowing into the second battery module through the second air intake surface. The battery pack includes: a one-side wall that is interposed between the first air intake surface of the first battery module and the second air intake surface of the second battery module, extends in the second direction, and seals the cooling air flow passage chamber from one side in a third direction orthogonal to both the first direction and the second direction; and an other-side wall that is interposed between the first air intake surface of the first battery module and the second air intake surface of the second battery module, extends in the second direction, is opposite to the one-side wall, and seals the cooling air flow passage chamber from the other side in the third direction. The one-side wall and the other-side wall are formed so as to be able to expand and contract in the first direction while maintaining the cooling air flow passage chamber in a sealed state.

In the above battery pack, the one-side wall and the other-side wall are provided between the first air intake surface of the first battery module and the second air intake surface of the second battery module to seal the cooling air flow passage chamber from the one side and the other side in the third direction. Since these one-side wall and other-side wall are formed so as to be able to expand and contract in the first direction (array direction), any dimensional variations in the dimension in the first direction (the dimension in the array direction) among the first battery modules or among the second battery modules can be absorbed as the one-side wall and the other-side wall expand and contract. It is therefore possible to reduce the dimensional variations in the dimension in the first direction (the dimension in the array direction) among the module blocks each having a first battery module and a second battery module disposed next to each other in the first direction (array direction).

The one-side wall and the other-side wall may be formed so as to be able to expand and contract in the first direction by being entirely formed so as to be able to expand and contract in the first direction. Alternatively, the one-side wall and the other-side wall may be formed so as to be able to expand and contract in the first direction by being only partially formed so as to be able to expand and contract in the first direction. The one-side wall and the other-side wall may be formed as parts separate from the first battery module and the second battery module, or may be integrally provided in at least either the first battery module or the second battery module.

In the latter case, for example, the one-side wall and the other-side wall may be provided in only the first battery module so that, when the first battery module and the second battery module are disposed in predetermined positions next to each other in the first direction, the cooling air flow passage chamber is sealed from both sides in the third direction by the one-side wall and the other-side wall. Alternatively, the one-side wall and the other-side wall may be provided in the first battery module and the second battery module, respectively, or conversely, the other-side wall and the one-side wall may be provided in the first battery module and the second battery module, respectively, so that, when the first battery module and the second battery module are disposed in predetermined positions next to each other in the first direction, the cooling air flow passage chamber is sealed from both sides in the third direction by the one-side wall and the other-side wall.

Yet another option is to provide a part of the one-side wall and a part of the other-side wall in the first battery module and provide the rest of the one-side wall and the rest of the other-side wall in the second battery module so that, when the first battery module and the second battery module are disposed in predetermined positions next to each other in the first direction, the cooling air flow passage chamber is sealed from both sides in the third direction by the one-side wall and the other-side wall. In this case, a portion or the whole of at least either the one part or the rest of the one-side wall is formed so as to be able to expand and contract in the first direction, and a portion or the whole of at least either the one part or the rest of the other-side wall is formed so as to be able to expand and contract in the first direction.

Examples of the method to form the one-side wall and the other-side wall so as to be able to expand and contract in the first direction while maintaining the cooling air flow passage chamber in a sealed state include a method of making the one-side wall and the other-side wall partially or entirely with a sponge-like resin material, such as urethane foam, or with a rubber material. Examples of the "battery" include a cylindrical battery and a rectangular battery.

In the above battery pack, a first one-side wall part forming a part of the one-side wall and a first other-side wall part forming a part of the other-side wall may be integrally provided in the first battery module. A second one-side wall part forming the rest of the one-side wall and a second other-side wall part forming the rest of the other-side wall may be integrally provided in the second battery module. The one-side wall may be formed by butting together the first one-side wall part and the second one-side wall part, and the other-side wall may be formed by butting together the first other-side wall part and the second other-side wall part.

In this battery pack, the one part of the one-side wall and the one part of the other-side wall (the first one-side wall part and the first other-side wall part) are integrally provided in the first battery module, and the rest of the one-side wall and the rest of the other-side wall (the second one-side wall part and the second other-side wall part) are integrally provided in the second battery module. Thus, compared with when the one-side wall and the other-side wall are formed as parts separate from the first battery module and the second battery module, these battery modules can be easily installed onto the battery pack, which contributes to making the battery pack inexpensive.

If the one-side wall is provided in only either the first battery module or the second battery module, and the other-side wall is provided in only either the first battery module or the second battery module, the amount of projection of the one-side wall or the other-side wall projecting in the first direction from the first battery module or the second battery module becomes large. In the above battery pack, by contrast, the one-side wall and the other-side wall are provided in both the first battery module and the second battery module by being divided into the first and second one-side wall parts and the first and second other-side wall parts, respectively. Thus, the amount of projection of the first one-side wall part and the first other-side wall part projecting in the first direction from the first battery module can be made smaller, and the amount of projection of the second one-side wall part and the second other-side wall part projecting in the first direction from the second battery module can be made smaller. This allows the first battery module and the second battery module to be easily installed onto the battery pack, which contributes to making the battery pack inexpensive.

In the above battery pack, the one-side wall may be at least partially made of a sponge-like resin material so as to be able to expand and contract in the first direction, and the other-side wall may be at least partially made of a sponge-like resin material so as to be able to expand and contract in the first direction.

In this battery pack, at least a part of each of the one-side wall and the other-side wall is made of a sponge-like resin material. Thus, dimensional variations in the dimension in the first direction occurring among the first battery modules or among the second battery modules can be appropriately absorbed as the one-side wall and the other-side wall (the parts thereof that are made of the sponge-like resin material) expand and contract. Moreover, the one-side wall and the other-side wall can be formed inexpensively, which contributes to making the battery pack inexpensive.

Any one of the above battery packs may include: a connector which seals the cooling air flow passage chamber from the one side in the second direction and communicates with the cooling air flow passage chamber and to which an air pipe that discharges the cooling air is attached; and a closure wall that seals the cooling air flow passage chamber from the other side in the second direction.

In this battery pack, the connector is provided on one side of the cooling air flow passage chamber in the second direction. By attaching the air pipe to this connector, cooling air can be easily supplied into the cooling air flow passage chamber so as to flow from the one side toward the other side in the second direction. On the other hand, the closure wall is provided on the other side of the cooling air flow passage chamber in the second direction. Thus, the cooling air inside the cooling air flow passage chamber can be prevented from flowing out toward the other side in the second direction, and the batteries in the first battery module and the second battery module can be cooled more appropriately.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiment

Figure 1:
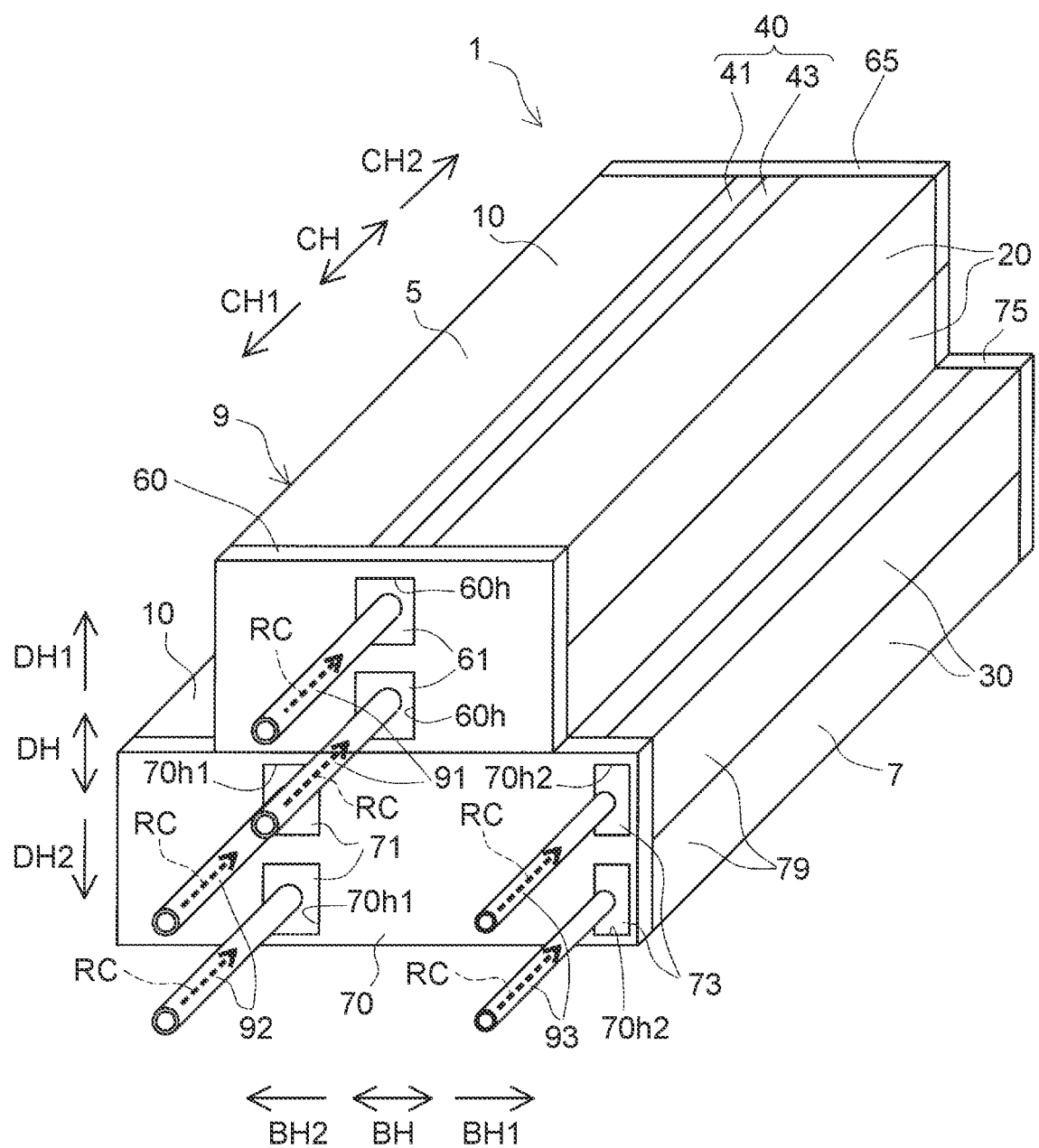
FIG. 1 is a perspective view of a battery pack according to an embodiment.
Figure 2:
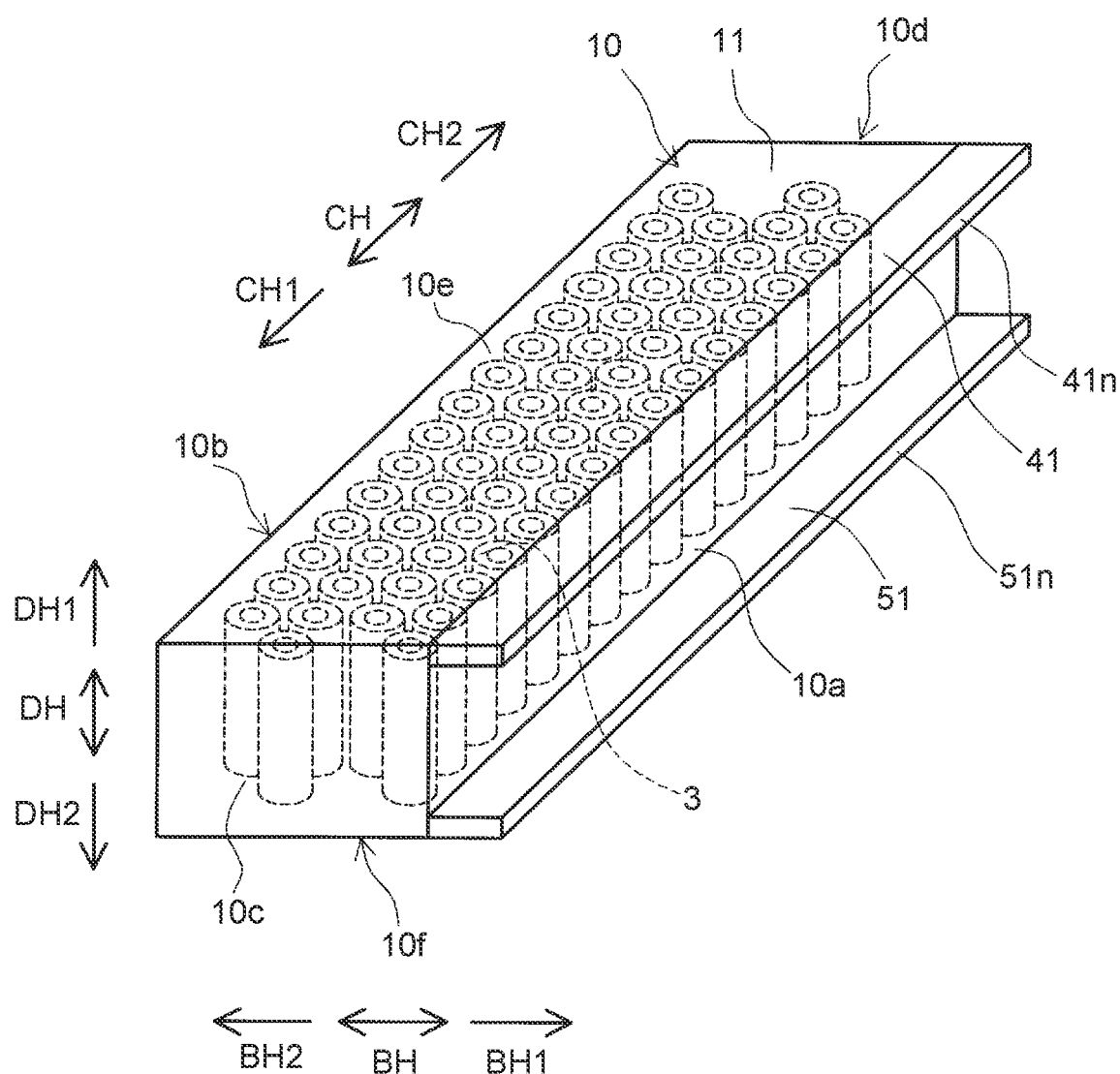
FIG. 2 is a perspective view of a first battery module according to the embodiment.
Figure 3:
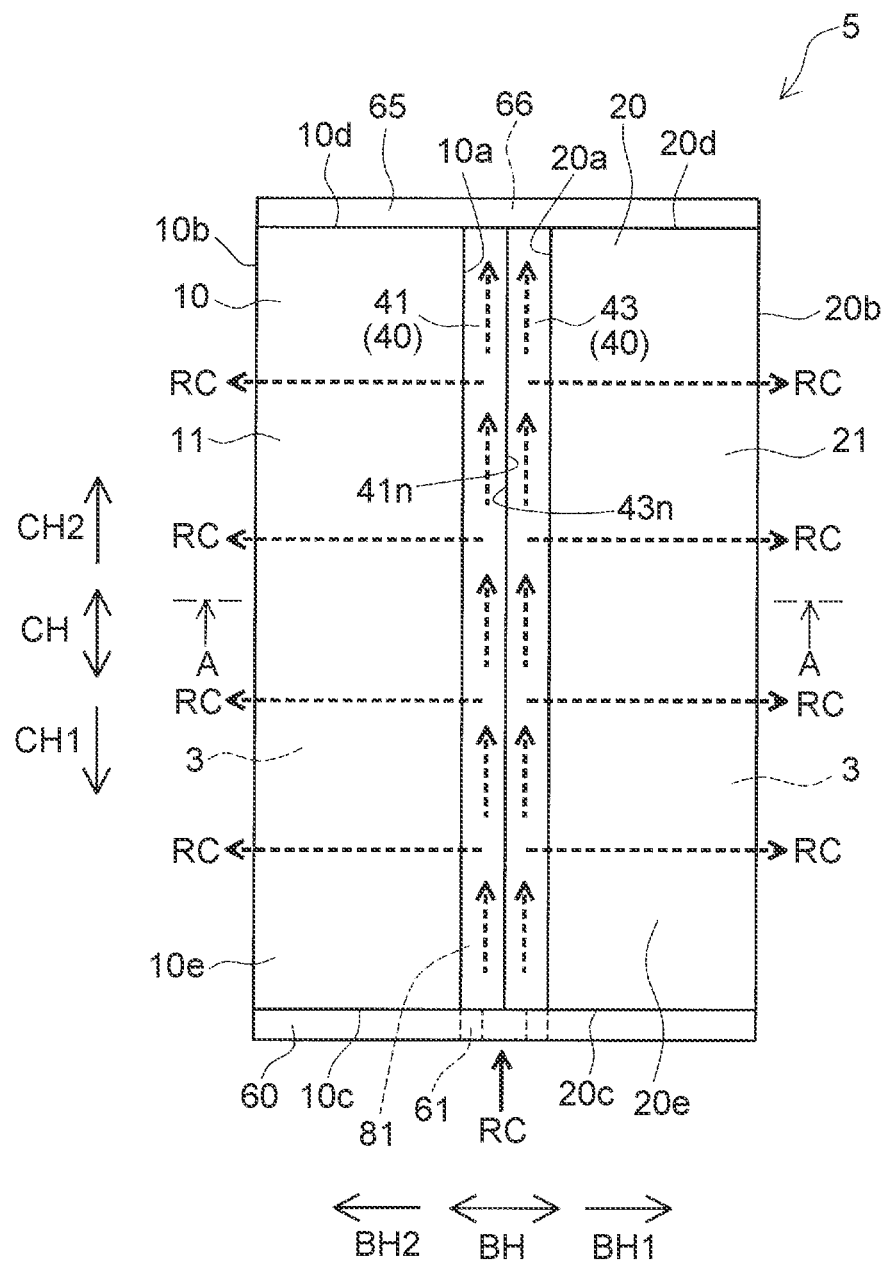
FIG. 3 is a top view of a first module block according to the embodiment.
Figure 4:
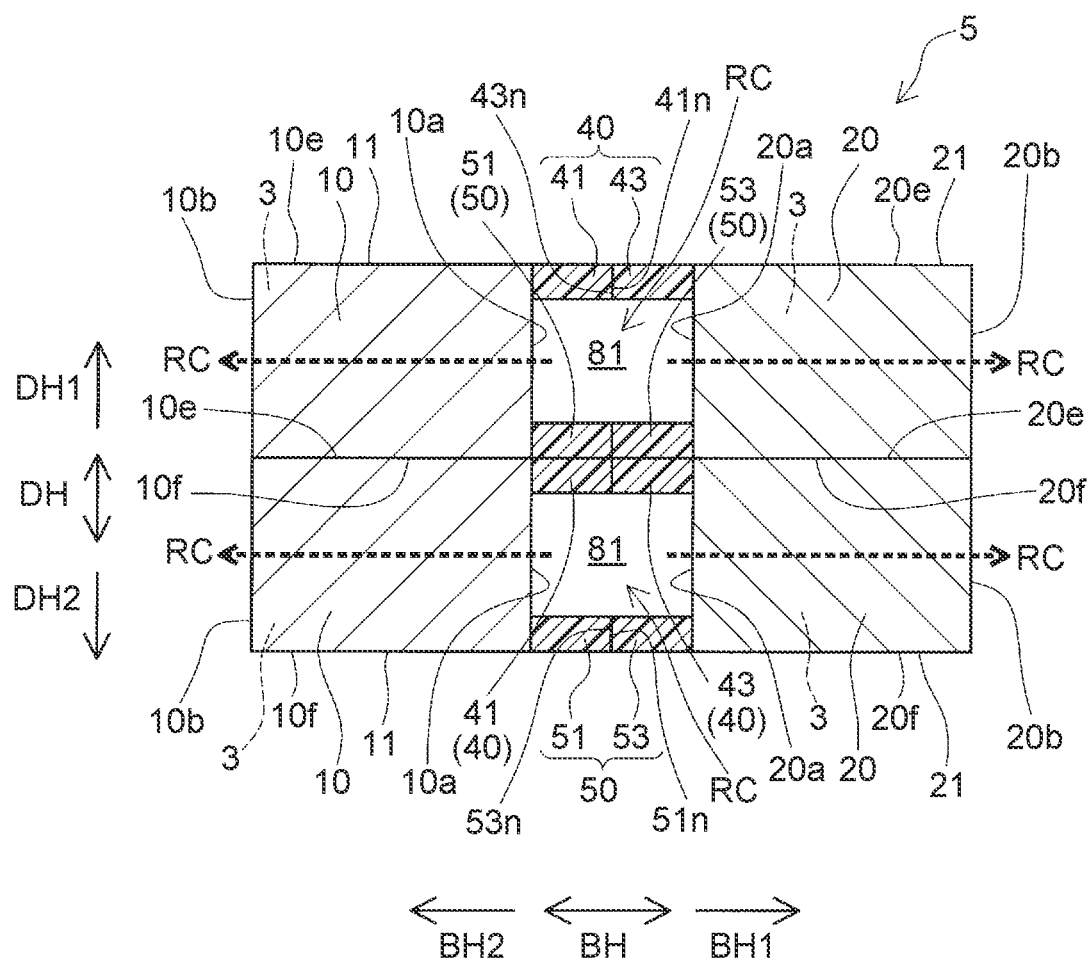
FIG. 4 is a sectional view of the first module block according to the embodiment, taken along line A-A in FIG. 3.
Figure 5:
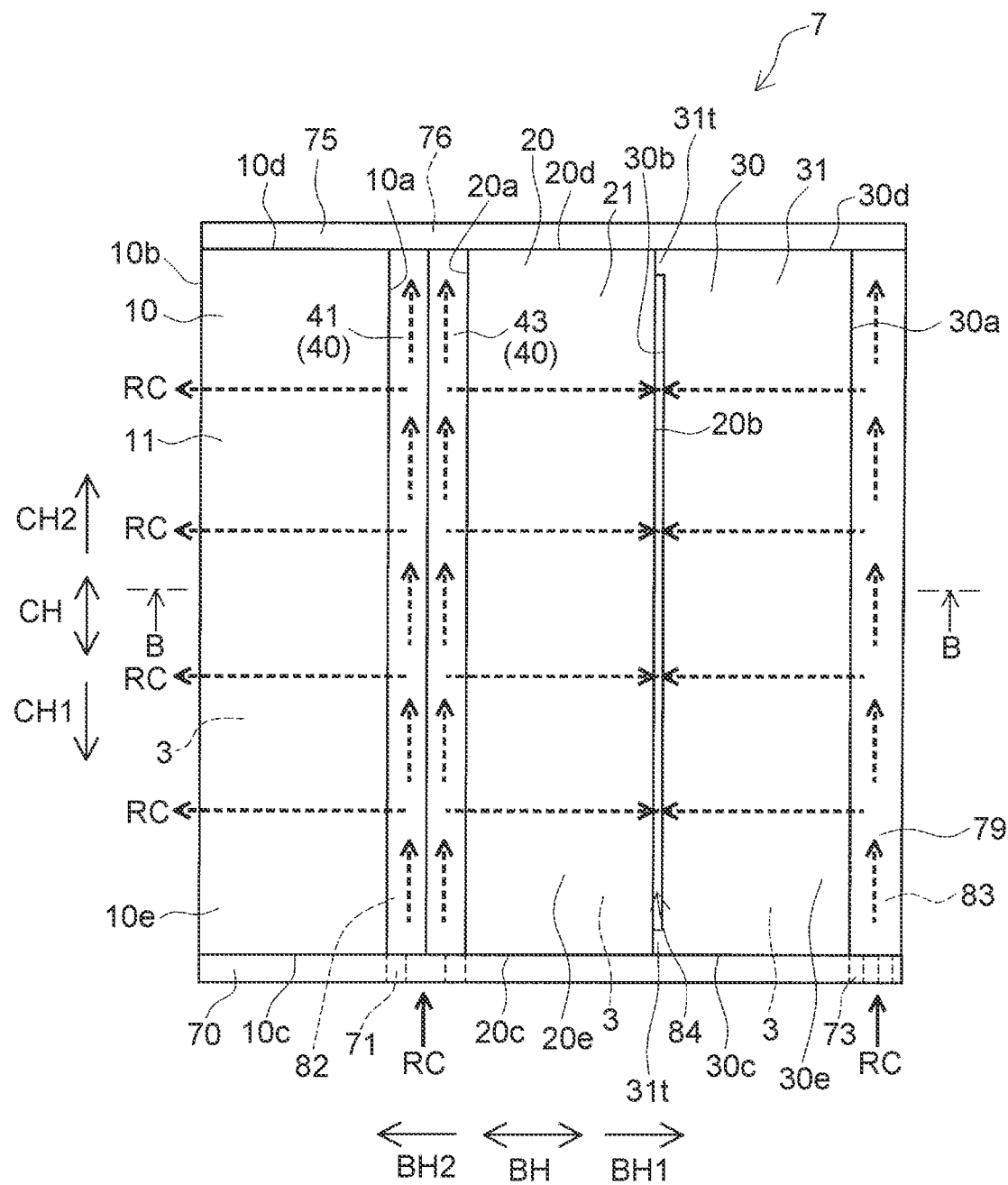
FIG. 5 is a top view of a second module block according to the embodiment.
Figure 6:
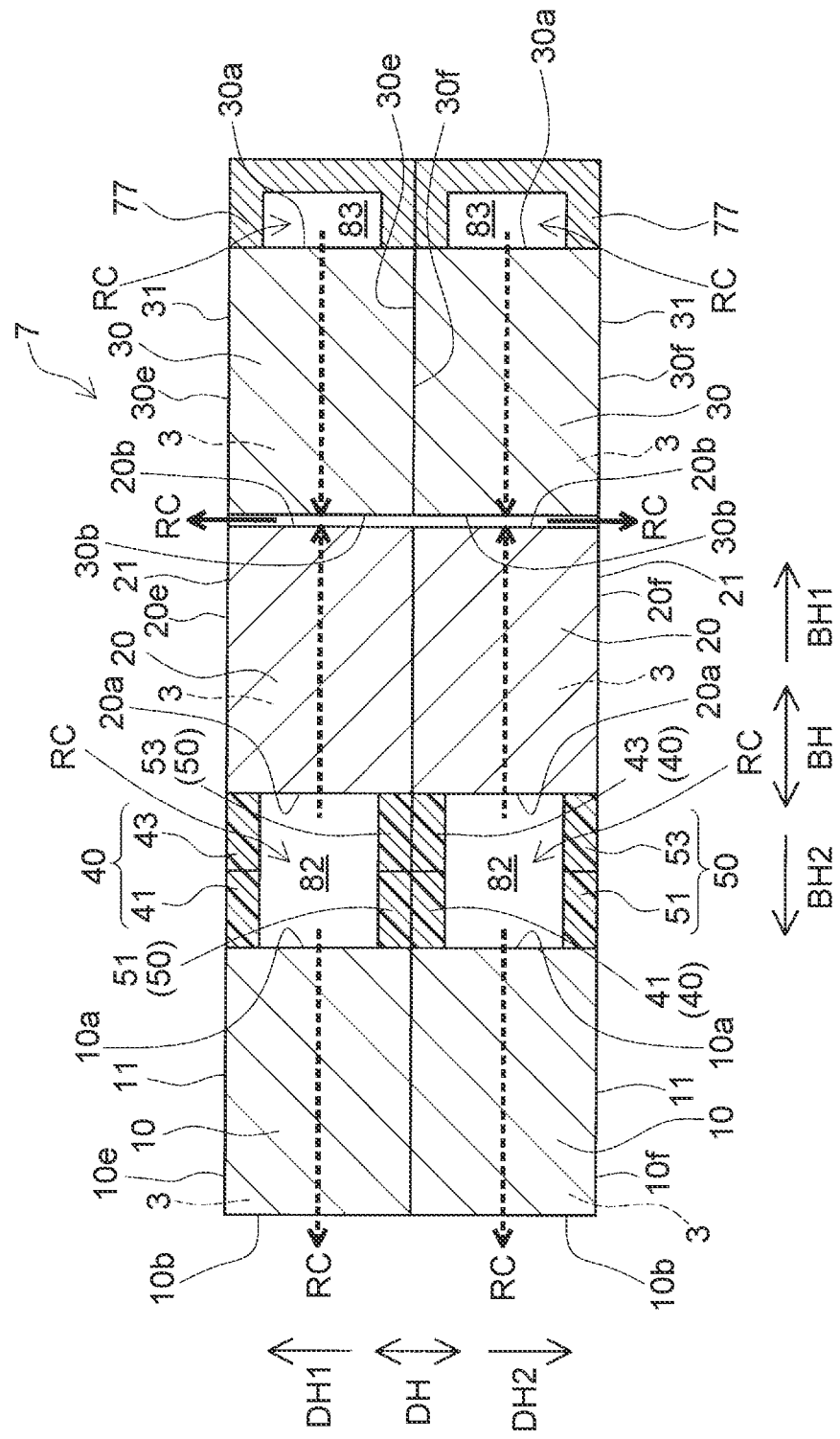
FIG. 6 is a sectional view of the second module block according to the embodiment, taken along line B-B in FIG. 5.

An embodiment of the present disclosure will be described below with reference to the drawings. FIG. 1 is a perspective view of a battery pack 1 according to the embodiment. FIG. 2 is a perspective view of a first battery module 10 included in the battery pack 1. FIG. 3 and FIG. 4 are a top view and a sectional view, respectively, of a first module block 5 included in the battery pack 1. FIG. 5 and FIG. 6 are a top view and a sectional view, respectively, of a second module block 7 included in the battery pack 1. In FIG. 4 and FIG. 6, interiors of the battery modules 10, 20, 30 are not shown. For the following description, a width direction (first direction) BH, a depth direction (second direction) CH, and a height direction (third direction) DH of the battery pack 1 are defined as those shown in FIG. 1 to FIG. 6. The battery pack 1 is an in-vehicle battery pack to be installed in a vehicle such as a hybrid vehicle, a plug-in hybrid vehicle, or an electric vehicle.

The battery pack 1 includes a battery main body 9 composed of two module blocks (the first module block 5 and the second module block 7), a pack case (not shown) that houses the battery main body 9, and a battery ECU (not shown) electrically connected to the battery main body 9. Of these components, the first module block 5 has four battery modules (two first battery modules 10 and two second battery modules 20). The first battery modules 10 are disposed one on top of the other in the height direction DH, and the second battery modules 20 are also disposed one on top of the other in the height direction DH. The first battery module 10 and the second battery module 20 located on an upper side (one side) DH1 in the height direction DH are disposed next to each other in the width direction BH, with an upper wall (one-side wall) 40 and a lower wall (other-side wall) 50 interposed therebetween, and so are the first battery module 10 and the second battery module 20 located on a lower side (the other side) DH2 in the height direction DH. The four battery modules 10, 20 of the first module block 5 are fixed to one another by a first front fixing member 60 and a first rear fixing member 65.

Specifically, each second battery module 20 is located on a right side (one side) BH1 of the first battery module 10 in the width direction BH. Between each first battery module 10 and the adjacent second battery module 20, the upper wall 40 is located at an end on the upper side DH1 and the lower wall 50 is located at an end on the lower side DH2. The first front fixing member 60 is located on a front side (one side) CH1 of the four battery modules 10, 20 in the depth direction CH, and the first rear fixing member 65 is located on a rear side (the other side) CH2 of the four battery modules 10, 20 in the depth direction CH.

Two first cooling air flow passage chambers 81 extending in the depth direction CH are formed that are each surrounded by the first battery module 10, the second battery module 20, the upper wall 40, the lower wall 50, the first front fixing member 60 (specifically, a first connector member 61 to be described later), and the first rear fixing member 65 (specifically, a first closure wall 66 to be described later), from the width direction BH (the right side BH1 and the left side BH2), the depth direction CH (the front side CH1 and the rear side CH2), and the height direction DH (the upper side DH1 and the lower side DH2).

First, the first battery module 10 will be described. The first battery module 10 has a first module case 11, and a plurality of (in this embodiment, 60) batteries 3 housed inside the first module case 11. The first module case 11 has a rectangular parallelepiped outer shape, and has a first air intake surface 10a, a first air discharge surface 10b, a first front surface 10c, a first back surface 10d, a first top surface 10e, and a first bottom surface 10f. Of these surfaces, the first air intake surface 10a faces the right side BH1 and extends in the depth direction CH. The first air intake surface 10a has a plurality of slits (openings; not shown), and through these slits, cooling air RC, to be described later, flows into the first battery module 10 from an outside of the first battery module 10. The first air discharge surface 10b faces the left side BH2 and extends in the depth direction CH. The first air discharge surface 10b also has a plurality of slits (openings; not shown), and through these slits, the cooling air RC is discharged from an inside of the first battery module 10 to the outside of the first battery module 10.

The first front surface 10c faces the front side CH1, and the first back surface 10d faces the rear side CH2. The first top surface 10e faces the upper side DH1 and extends in the depth direction CH, and the first bottom surface 10f faces the lower side DH2 and extends in the depth direction CH. These first front surface 10c, first back surface 10d, first top surface 10e, and first bottom surface 10f are surfaces having no slits or the like. This form of the first battery module 10 causes the cooling air RC taken into the first battery module 10 through the slits in the first air intake surface 10a to flow inside the first battery module 10 toward the left side BH2 and cool the batteries 3 held inside the first battery module 10. Then, the cooling air RC is discharged to the outside of the first battery module 10 through the slits in the first air discharge surface 10b.

Each of the batteries 3 included in the first battery module 10 is a 18650-type cylindrical lithium-ion secondary battery. The batteries 3 are held inside the first module case 11, with positive-electrode terminals facing the upper side DH1 and negative-electrode terminals facing the lower side DH2, so as to be parallel to one another and aligned in the height direction. Specifically, as seen from the height direction DH, the batteries 3 are disposed in a staggered arrangement with four rows in the width direction BH and 15 rows in the depth direction CH. The batteries 3 are connected in parallel to one another in groups of 15 through bus bars (not shown), and these four battery groups are further connected in series with one another.

Next, the second battery module 20 will be described. The form of the second battery module 20 itself is the same as that of the first battery module 10, and the only difference between these modules is the arrangement (orientation) when the first module block 5 is formed. (As will be described later, the second battery module 20 is disposed with the front side and the rear side reversed from those of the first battery module 10 such that a second air intake surface 20a faces the left side BH2 while a second air discharge surface 20b faces the right side BH1). Specifically, the second battery module 20 includes a second module case 21 with a rectangular parallelepiped outer shape, similar to the first module case 11, and inside the second module case 21, a plurality of (in this embodiment, 60) batteries 3 are disposed as in the first battery module 10. The second module case 21 has the second air intake surface 20a, the second air discharge surface 20b, a second front surface 20c, a second back surface 20d, a second top surface 20e, and a second bottom surface 20f.

Of these surfaces, the second air intake surface 20a, like the first air intake surface 10a of the first battery module 10, has a plurality of slits (openings; not shown). However, while the first air intake surface 10a of the first battery module 10 faces the right side BH1, the second air intake surface 20a of the second battery module 20 faces the left side BH2. Like the first air discharge surface 10b of the first battery module 10, the second air discharge surface 20b has a plurality of slits (openings; not shown). However, while the first air discharge surface 10b of the first battery module 10 faces the left side BH2, the second air discharge surface 20b of the second battery module 20 faces the right side BH1. The second front surface 20c faces the front side CH1, and the second back surface 20d faces the rear side CH2. The second top surface 20e faces the upper side DH1 and extends in the depth direction CH, and the second bottom surface 20f faces the lower side DH2 and extends in the depth direction CH.

Next, the upper wall 40 will be described. The upper wall 40 has a shape of a plate extending in the depth direction CH. The upper wall 40 is interposed at an end on the upper side DH1 of a space between the first air intake surface 10a and the second air intake surface 20a of the first battery module 10 and the second battery module 20 that are adjacent to each other in the width direction BH, to seal the first cooling air flow passage chamber 81 from the upper side DH1. Thus, the cooling air RC flowing inside the first cooling air flow passage chamber 81 can be prevented from flowing out toward the upper side DH1.

Moreover, the upper wall 40 is formed so as to be able to expand and contract in the width direction BH. Specifically, the upper wall 40 is formed by butting together, in the width direction BH, a first upper wall part (first one-side wall part) 41 having a shape of a plate extending in the depth direction CH and a second upper wall part (second one-side wall part) 43 having a similar plate shape. The first upper wall part 41 and the second upper wall part 43 are entirely made of a sponge-like resin material (in this embodiment, urethane foam). Therefore, the first upper wall part 41 and the second upper wall part 43 are each able to expand and contract in the width direction BH, and the upper wall 40 as a whole is also able to expand and contract in the width direction BH.

Specifically, the first upper wall part 41 is joined to the first air intake surface 10a of the first battery module 10, extends in the depth direction CH, and protrudes toward the right side BH1. On the other hand, the second upper wall part 43 is joined to the second air intake surface 20a of the second battery module 20, extends in the depth direction CH, and protrudes toward the left side BH2. The first upper wall part 41 and the second upper wall part 43 are compressed in the width direction BH in a state where a leading end surface 41n of the first upper wall part 41 facing the right side BH1 and a leading end surface 43n of the second upper wall part 43 facing the left side BH2 are in close contact with each other.

Next, the lower wall 50 will be described. The lower wall 50 has a shape of a plate extending in the depth direction CH, similar to the shape of the upper wall 40. The lower wall 50 is interposed at an end on the lower side DH2 of the space between the first air intake surface 10a and the second air intake surface 20a of the first battery module 10 and the second battery module 20 that are adjacent to each other in the width direction BH, to seal the first cooling air flow passage chamber 81 from the lower side DH2. Thus, the cooling air RC flowing inside the first cooling air flow passage chamber 81 can be prevented from flowing out toward the lower side DH2.

Moreover, like the upper wall 40, the lower wall 50 is formed so as to be able to expand and contract in the width direction BH. Specifically, the lower wall 50 is formed by butting together, in the width direction BH, a first lower wall part (first other-side wall part) 51 having a shape of a plate extending in the depth direction CH and a second lower wall part (second other-side wall part) 53 having a similar plate shape. The first lower wall part 51 and the second lower wall part 53 are also entirely made of a sponge-like resin material (in this embodiment, urethane foam). Therefore, the first lower wall part 51 and the second lower wall part 53 are each able to expand and contract in the width direction BH, and the lower wall 50 as a whole is also able to expand and contract in the width direction BH.

Specifically, the first lower wall part 51 is joined to the first air intake surface 10a of the first battery module 10, extends in the depth direction CH, and protrudes toward the right side BH1. On the other hand, the second lower wall part 53 is joined to the second air intake surface 20a of the second battery module 20, extends in the depth direction CH, and protrudes toward the left side BH2. The first lower wall part 51 and the second lower wall part 53 are compressed in the width direction BH in a state where a leading end surface 51n of the first lower wall part 51 facing the right side BH1 and a leading end surface 53n of the second lower wall part 53 facing the left side BH2 are in close contact with each other.

Next, the first front fixing member 60 will be described. The first front fixing member 60 has a shape of a rectangular plate spreading in the width direction BH and the height direction DH. The first front fixing member 60 is fastened with screws to the first battery modules 10 and the second battery modules 20, in a state of covering, from the front side CH1, the entire first front surfaces 10c and second front surfaces 20c of the two first battery modules 10 and the two second battery modules 20 forming the first module block 5. The four battery modules 10, 20 are fixed to one another by the first front fixing member 60 and the first rear fixing member 65 to be described later.

At a center of the first front fixing member 60 in the width direction BH, two openings 60h each having a rectangular shape as seen from the front side and communicating with the first cooling air flow passage chamber 81 are formed side by side in the height direction DH. A first connector member (connector) 61 is fitted in each opening 60h. The first connector member 61 seals the first cooling air flow passage chamber 81 from the front side CH1 and communicates with the first cooling air flow passage chamber 81, and a first air pipe 91 that discharges the cooling air RC can be attached to the first connector member 61. The first air pipe 91 is attached to each first connector member 61. Thus, the cooling air RC can be supplied into the first cooling air flow passage chamber 81 from the front side CH1 so as to flow toward the rear side CH2.

Next, the first rear fixing member 65 will be described. The first rear fixing member 65 has a shape of a rectangular plate spreading in the width direction BH and the height direction DH. The first rear fixing member 65 is fastened with screws to the first battery modules 10 and the second battery modules 20, in a state of covering, from the rear side CH2, the entire first back surfaces 10d and second back surfaces 20d of the two first battery modules 10 and the two second battery modules 20 forming the first module block 5. The four battery modules 10, 20 are fixed to one another by the first rear fixing member 65 and the first front fixing member 60. Each first cooling air flow passage chamber 81 is sealed from the rear side CH2 by a part of the first rear fixing member 65 (the first closure wall 66 forming a central part in the width direction BH). Thus, the cooling air RC flowing inside the first cooling air flow passage chamber 81 can be prevented from flowing out toward the rear side CH2.

The battery pack 1 further includes a blower (not shown) that sends the cooling air RC from an outside to an inside of the battery pack 1, and the first air pipes 91 are connected to this blower. Thus, the cooling air RC sent into the battery pack 1 by the blower is supplied into each first cooling air flow passage chamber 81 of the first module block 5 through the first air pipe 91. Moreover, the cooling air RC flows inside the first cooling air flow passage chamber 81 from the front side CH1 toward the rear side CH2, and is taken into the first battery module 10 through the first air intake surface 10a and taken into the second battery module 20 through the second air intake surface 20a.

Furthermore, the cooling air RC having flowed into the first battery module 10 flows inside the first battery module 10 toward the left side BH2 while cooling the batteries 3, and is discharged to the outside of the first battery module 10 through the first air discharge surface 10b and further discharged to the outside of the battery pack 1. The cooling air RC having flowed into the second battery module 20 flows inside the second battery module 20 toward the right side BH1 while cooling the batteries 3, and is discharged to the outside of the second battery module 20 through the second air discharge surface 20b and further discharged to the outside of the battery pack 1.

Figure 7:
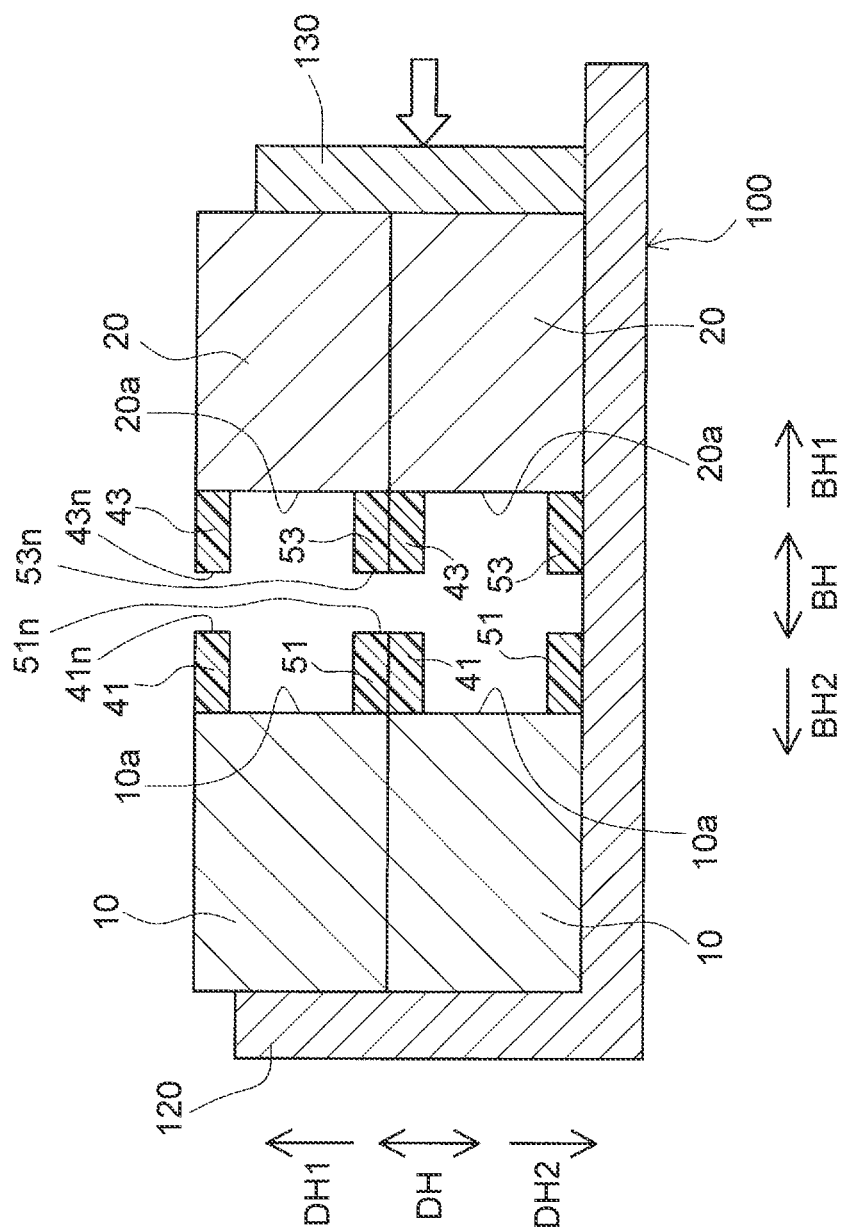
FIG. 7 is a view according to the embodiment, illustrating how the first battery modules and the second battery modules are placed in predetermined positions, next to each other in a first direction, to form the first module block.

Here, a method of fixing the four battery modules 10, 20 using the first front fixing member 60 and the first rear fixing member 65 to form the first module block 5 will be described (see FIG. 7). The first upper wall part 41 and the first lower wall part 51 are joined in advance to an upper part and a lower part, respectively, of the first air intake surface 10a of the first battery module 10. The second upper wall part 43 and the second lower wall part 53 are joined in advance to an upper part and a lower part, respectively, of the second air intake surface 20a of the second battery module 20.

Next, an installation device 100 is prepared, and the four battery modules 10, 20 are placed in predetermined positions on an installation base 110 of the installation device 100. Specifically, the first battery modules 10 are placed in a predetermined position on the left side BH2 in the installation base 110, one on top of the other in the height direction DH. The second battery modules 20 are placed in a predetermined position on the right side BH1 in the installation base 110, one on top of the other in the height direction DH. Thereafter, a moving wall 130 of the installation device 100 is moved toward the left side BH2, and the second battery modules 20 are moved toward the left side BH2 by the moving wall 130. The moving wall 130 is moved toward the left side BH2 until the clearance between the moving wall 130 and a fixed wall 120 located on the left side BH2 of the first battery modules 10 becomes a predetermined clearance (a clearance of a dimension equal to a dimension La in the width direction (a dimension in the first direction; a dimension in the array direction) of the first module block 5), and thus the first battery modules 10 and the second battery modules 20 are sandwiched in the width direction BH between the moving wall 130 and the fixed wall 120.

As a result, the upper wall 40 is formed in which the leading end surface 41n of the first upper wall part 41 provided in the first battery module 10 and the leading end surface 43n of the second upper wall part 43 provided in the second battery module 20 are pressed against each other so as to be in close contact with each other, and in which, moreover, the first upper wall part 41 and the second upper wall part 43 are contracted in the width direction BH. The lower wall 50 is formed in which the leading end surface 51n of the first lower wall part 51 provided in the first battery module 10 and the leading end surface 53n of the second lower wall part 53 provided in the second battery module 20 are pressed against each other so as to be in close contact with each other, and in which, moreover, the first lower wall part 51 and the second lower wall part 53 are contracted in the width direction BH. In addition, the first cooling air flow passage chambers 81 are formed that are each surrounded by the first air intake surface 10a of the first battery module 10 and the second air intake surface 20a of the second battery module 20 from the width direction BH (the right side BH1 and the left side BH2), and by the upper wall 40 and the lower wall 50 from the height direction DH (the upper side DH1 and the lower side DH2).

Thereafter, while this state is maintained, the first front fixing member 60 is placed on the front surfaces 10c, 20c of the four battery modules 10, 20 from the front side CH1 and fastened with screws to the battery modules 10, 20, and the first rear fixing member 65 is placed on the back surfaces 10d, 20d of the four battery modules 10, 20 from the rear side CH2 and fastened with screws to the battery modules 10, 20. Thus, the four battery modules 10, 20 are fixed to one another by the first front fixing member 60 and the first rear fixing member 65 to form the first module block 5.

Figure 8:
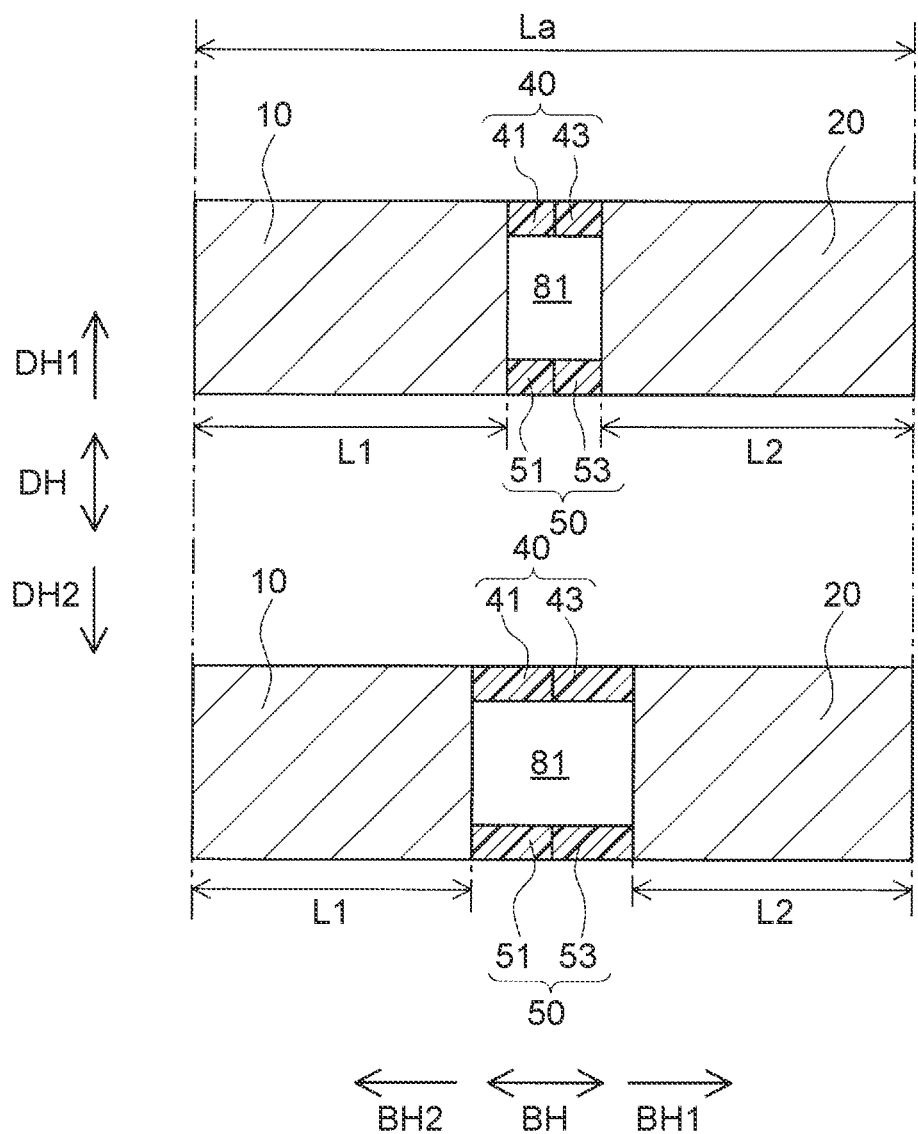
FIG. 8 is a view relating to the first module block according to the embodiment, illustrating how dimensional variations in the dimension in the first direction among the first battery modules and among the second battery modules are absorbed as a one-side wall and an other-side wall expand and contract.

As shown in FIG. 8, there are dimensional variations among the first battery modules 10 in a dimension L1 in the width direction (a dimension in the first direction; a dimension in the array direction), and among the second battery modules 20 in a dimension L2 in the width direction (a dimension in the first direction; a dimension in the array direction). In an upper part of FIG. 8, a first battery module 10 and a second battery module 20 having relatively large dimensions L1, L2 in the width direction are shown, and in a lower part of FIG. 8, a first battery module 10 and a second battery module 20 having relatively small dimensions L1, L2 in the width direction are shown.

However, as described above, the upper wall 40 and the lower wall 50 are each made of the sponge-like resin material and able to expand and contract in the width direction BH. Therefore, the dimensional variations in the dimensions L1, L2 in the width direction among the battery modules 10, 20 can be absorbed by the amount of contraction of the upper wall 40 and the lower wall 50. This makes it possible to set the dimension La of the first module block 5 in the width direction to a constant value without dimensional variations, as shown in FIG. 8.

Next, the second module block 7 will be described. The second module block 7 has six battery modules (two first battery modules 10, two second battery modules 20, and two third battery modules 30). The first battery modules 10 are disposed one on top of the other in the height direction DH; the second battery modules 20 are also disposed one on top of the other in the height direction DH; and the third battery modules 30 are also disposed one on top of the other in the height direction DH. As in the first module block 5, the first battery module 10 and the second battery module 20 located on the upper side DH1 are disposed next to each other in the width direction BH, with the upper wall 40 and the lower wall 50 interposed therebetween, and so are the first battery module 10 and the second battery module 20 located on the lower side DH2. Moreover, the third battery module 30 located on the upper side DH1 and the third battery module 30 located on the lower side DH2 are disposed on the right side BH1 of the second battery modules 20, next to the second battery modules 20. The six battery modules 10, 20, 30 of the second module block 7 are fixed to one another by a second front fixing member 70 and a second rear fixing member 75.

Also in the second module block 7, two second cooling air flow passage chambers 82 extending in the depth direction CH, similar to the first cooling air flow passage chambers 81 of the first module block 5, are formed that are each surrounded by the first battery module 10, the second battery module 20, the upper wall 40, the lower wall 50, the second front fixing member 70 (specifically, a second connector member 71 to be described later), and the second rear fixing member 75 (specifically, a second closure wall 76 to be described later), from the width direction BH (the right side BH1 and the left side BH2), the depth direction CH (the front side CH1 and the rear side CH2), and the height direction DH (the upper side DH1 and the lower side DH2).

The first battery modules 10 and the second battery modules 20 of the second module block 7 are the same as the first battery modules 10 and the second battery modules 20 of the first module block 5. The third battery modules 30 are similar to the first battery modules 10. Specifically, the third battery module 30 includes a third module case 31, similar to the first module case 11, that has a third air intake surface 30a, a third air discharge surface 30b, a third front surface 30c, a third back surface 30d, a third top surface 30e, and a third bottom surface 30f.

A flow passage forming member 79 made of a resin that does not expand or contract and having an upper wall, a lower wall, and a side wall that form a squared U-shaped cross section, is mounted on the third air intake surface 30a of the third battery module 30. Third cooling air flow passage chambers 83 extending in the depth direction CH are formed that are each surrounded by the third air intake surface 30a and the flow passage forming member 79 from the width direction BH and the height direction DH. A plurality of protrusions 31t protruding toward the left side BH2 is provided on the third air discharge surface 30b of the third battery module 30. In a state where the second module block 7 is formed, these protrusions 31t are pressed against the second air discharge surface 20b of the second battery module 20, so that a gap 84 is formed between the second air discharge surface 20b of the second battery module 20 and the third air discharge surface 30b of the third battery module 30. Thus, the cooling air RC having flowed inside the second battery module 20 is discharged into the gap 84 through the second air discharge surface 20b, and the cooling air RC having flowed inside the third battery module 30 is discharged into the gap 84 through the third air discharge surface 30b.

Next, the second front fixing member 70 will be described. The second front fixing member 70 has a shape of a rectangular plate spreading in the width direction BH and the height direction DH. The second front fixing member 70 is fastened with screws to the first battery modules 10, the second battery modules 20, and the third battery modules 30, in a state of covering, from the front side CH1, the entire first front surfaces 10c, second front surfaces 20c, and third front surfaces 30c of the two first battery modules 10, the two second battery modules 20, and the two third battery modules 30 forming the second module block 7. The six battery modules 10, 20, 30 are fixed to one another by the second front fixing member 70 and the second rear fixing member 75 to be described later.

In the second front fixing member 70, two first openings 70h1 each having a rectangular shape as seen from the front side and communicating with the second cooling air flow passage chamber 82 are formed side by side in the height direction DH. A second connector member 71 similar to the first connector member 61 of the first module block 5 is fitted in each first opening 70h1. The second connector member 71 seals the second cooling air flow passage chamber 82 from the front side CH1 and communicates with the second cooling air flow passage chamber 82, and a second air pipe 92 that discharges the cooling air RC can be attached to the second connector member 71. The second air pipe 92 is attached to each second connector member 71. Thus, the cooling air RC can be supplied from the front side CH1 into the second cooling air flow passage chamber 82 so as to flow toward the rear side CH2.

In the second front fixing member 70, two second openings 70h2 having a rectangular shape as seen from the front side and communicating with the third cooling air flow passage chamber 83 are also formed side by side in the height direction DH. A third connector member 73 is fitted in each second opening 70h2. The third connector member 73 seals the third cooling air flow passage chamber 83 from the front side CH1 and communicates with the third cooling air flow passage chamber 83, and a third air pipe 93 that discharges the cooling air RC can be attached to the third connector member 73. The third air pipe 93 is attached to each third connector member 73. Thus, the cooling air RC can be supplied into the third cooling air flow passage chamber 83 from the front side CH1 so as to flow toward the rear side CH2.

Next, the second rear fixing member 75 will be described. The second rear fixing member 75 has a shape of a rectangular plate spreading in the width direction BH and the height direction DH. The second rear fixing member 75 is fastened with screws to the first battery modules 10, the second battery modules 20, and the third battery modules 30, in a state of covering, from the rear side CH2, the entire first back surfaces 10d, second back surfaces 20d, and third back surfaces 30d of the two first battery modules 10, the two second battery modules 20, and the two third battery modules 30 forming the second module block 7.

The six battery modules 10, 20, 30 are fixed to one another by the second rear fixing member 75 and the second front fixing member 70. The second cooling air flow passage chambers 82 are each sealed from the rear side CH2 by a part (the second closure wall 76) of the second rear fixing member 75, and the third cooling air flow passage chambers 83 are each sealed from the rear side CH2 by another part (the third closure wall 77) of the second rear fixing member 75. Thus, the cooling air RC flowing inside the second cooling air flow passage chambers 82 can be prevented from flowing out toward the rear side CH2, and the cooling air RC flowing inside the third cooling air flow passage chambers 83 can be prevented from flowing out toward the rear side CH2.

As described above, the battery pack 1 includes the blower (not shown) that sends the cooling air RC into the battery pack 1, and the second air pipes 92 and the third air pipes 93 are also connected to this blower. Thus, the cooling air RC is supplied into each second cooling air flow passage chamber 82 of the second module block 7 through the second air pipe 92. As with the case of the first module block 5, the cooling air RC flows inside the second cooling air flow passage chamber 82 from the front side CH1 toward the rear side CH2, and is taken into the first battery module 10 through the first air intake surface 10a and taken into the second battery module 20 through the second air intake surface 20a.

In the second module block 7, the cooling air RC is further supplied into each third cooling air flow passage chamber 83 through the third air pipe 93. The cooling air RC flows inside the third cooling air flow passage chamber 83 from the front side CH1 toward the rear side CH2, and is taken into the third battery module 30 through the third air intake surface 30a. Moreover, the cooling air RC flows inside the third battery module 30 toward the left side BH2 while cooling the batteries 3, and is discharged to the outside of the third battery module 30 through the third air discharge surface 30b and further discharged to the outside of the battery pack 1.

Figure 9:
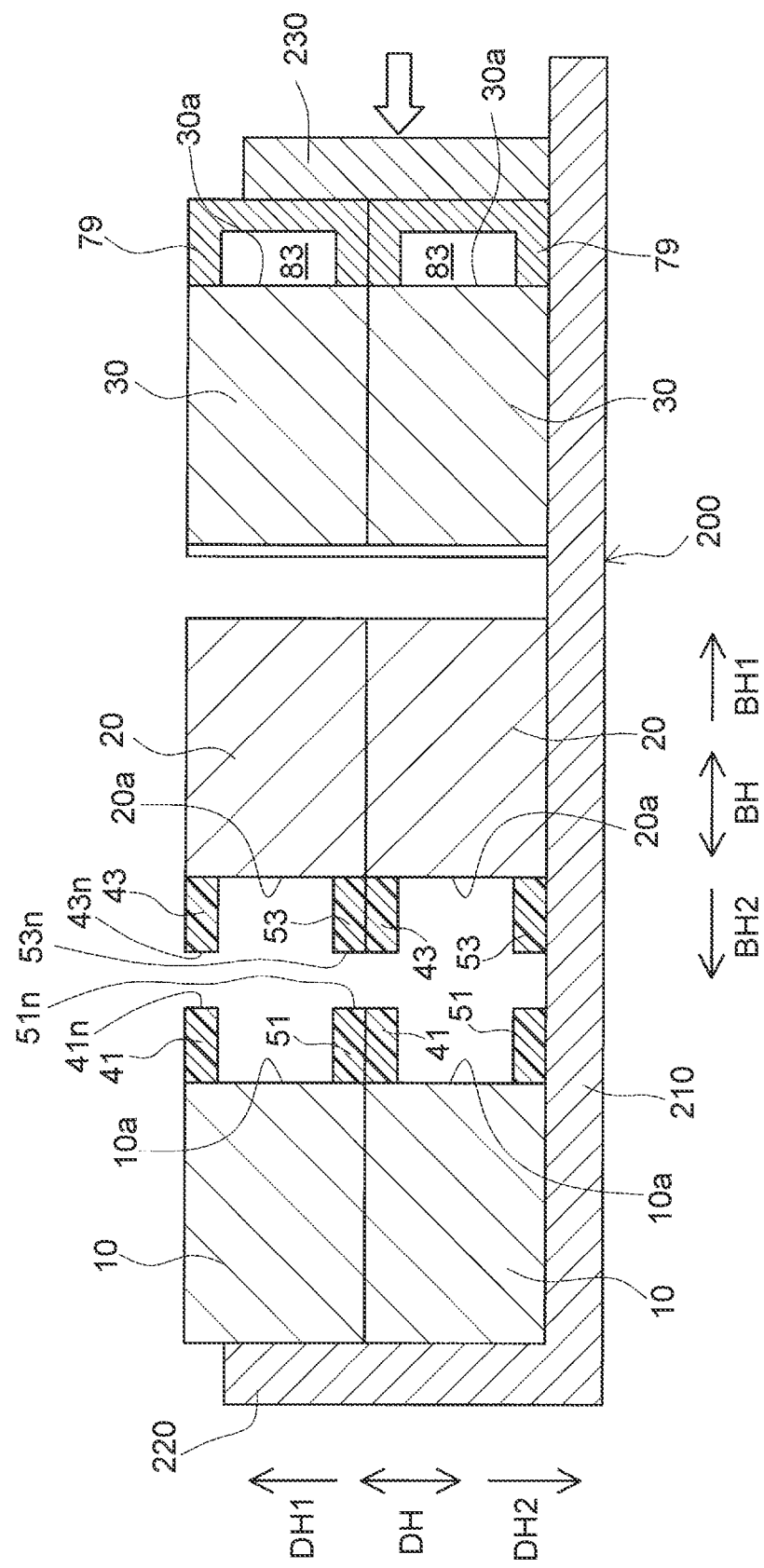
FIG. 9 is a view according to the embodiment, illustrating how the first battery modules, the second battery modules, and third battery modules are placed in predetermined positions, next to one another in the first direction, to form the second module block.

Here, a method of fixing the six battery modules 10, 20, 30 with the second front fixing member 70 and the second rear fixing member 75 to form the second module block 7 will be described (see FIG. 9). As with the case of the first module block 5, the first upper wall part 41 and the first lower wall part 51 are joined in advance to an upper part and a lower part, respectively, of the first air intake surface 10a of the first battery module 10. The second upper wall part 43 and the second lower wall part 53 are joined in advance to an upper part and a lower part, respectively, of the second air intake surface 20a of the second battery module 20. Further, the flow passage forming members 79 are mounted to the third air intake surfaces 30a of the third battery modules 30 to form the third cooling air flow passage chambers 83.

Next, an installation device 200 is prepared, and the six battery modules 10, 20, 30 are placed in predetermined positions on an installation base 210 of the installation device 200. Specifically, the first battery modules 10 are placed in a predetermined position, on the left side BH2 in the installation base 210, one on top of the other in the height direction DH. The second battery modules 20 are placed in a predetermined position, on the right side BH1 of the first battery modules 10 in the installation base 210, one on top of the other in the height direction DH. Further, the third battery modules 30 are placed in a predetermined position, on the right side BH1 of the second battery modules 20 in the installation base 210, one on top of the other in the height direction DH.

Thereafter, a moving wall 230 of the installation device 200 is moved toward the left side BH2, and the third battery modules 30 and further the second battery modules 20 are moved toward the left side BH2 by the moving wall 230. The moving wall 230 is moved toward the left side BH2 until the clearance between the moving wall 230 and a fixed wall 220 located on the left side BH2 of the first battery modules 10 becomes a predetermined clearance (a clearance of a dimension equal to a dimension Lb in the width direction (a dimension in the first direction; a dimension in the array direction) of the second module block 7), and thus the first battery modules 10, the second battery modules 20, and the third battery modules 30 are sandwiched in the width direction BH between the moving wall 230 and the fixed wall 220.

As a result, the upper wall 40 is formed in which the leading end surface 41n of the first upper wall part 41 provided in the first battery module 10 and the leading end surface 43n of the second upper wall part 43 provided in the second battery module 20 are pressed against each other so as to be in close contact with each other, and in which, moreover, the first upper wall part 41 and the second upper wall part 43 are contracted in the width direction BH. The lower wall 50 is formed in which the leading end surface 51n of the first lower wall part 51 provided in the first battery module 10 and the leading end surface 53n of the second lower wall part 53 provided in the second battery module 20 are pressed against each other so as to be in contact with each other, and in which, moreover, the first lower wall part 51 and the second lower wall part 53 are contracted in the width direction BH. In addition, the first cooling air flow passage chambers 81 are formed that are each surrounded by the first air intake surface 10a of the first battery module 10 and the second air intake surface 20a of the second battery module 20 from the width direction BH (the right side BH1 and the left side BH2), and by the upper wall 40 and the lower wall 50 from the height direction DH (the upper side DH1 and the lower side DH2). The second battery modules 20 and the third battery modules 30 are pressed against each other in the width direction BH.

Thereafter, while this state is maintained, the second front fixing member 70 is placed on the front surfaces 10c, 20c, 30c of the six battery modules 10, 20, 30 from the front side CH1 and fastened with screws to the battery modules 10, 20, 30. The second rear fixing member 75 is placed on the back surfaces 10d, 20d, 30d of the six battery modules 10, 20, 30 from the rear side CH2 and fastened with screws to the battery modules 10, 20, 30. Thus, the six battery modules 10, 20, 30 are fixed to one another by the second front fixing member 70 and the second rear fixing member 75 to form the second module block 7.

Figure 10:
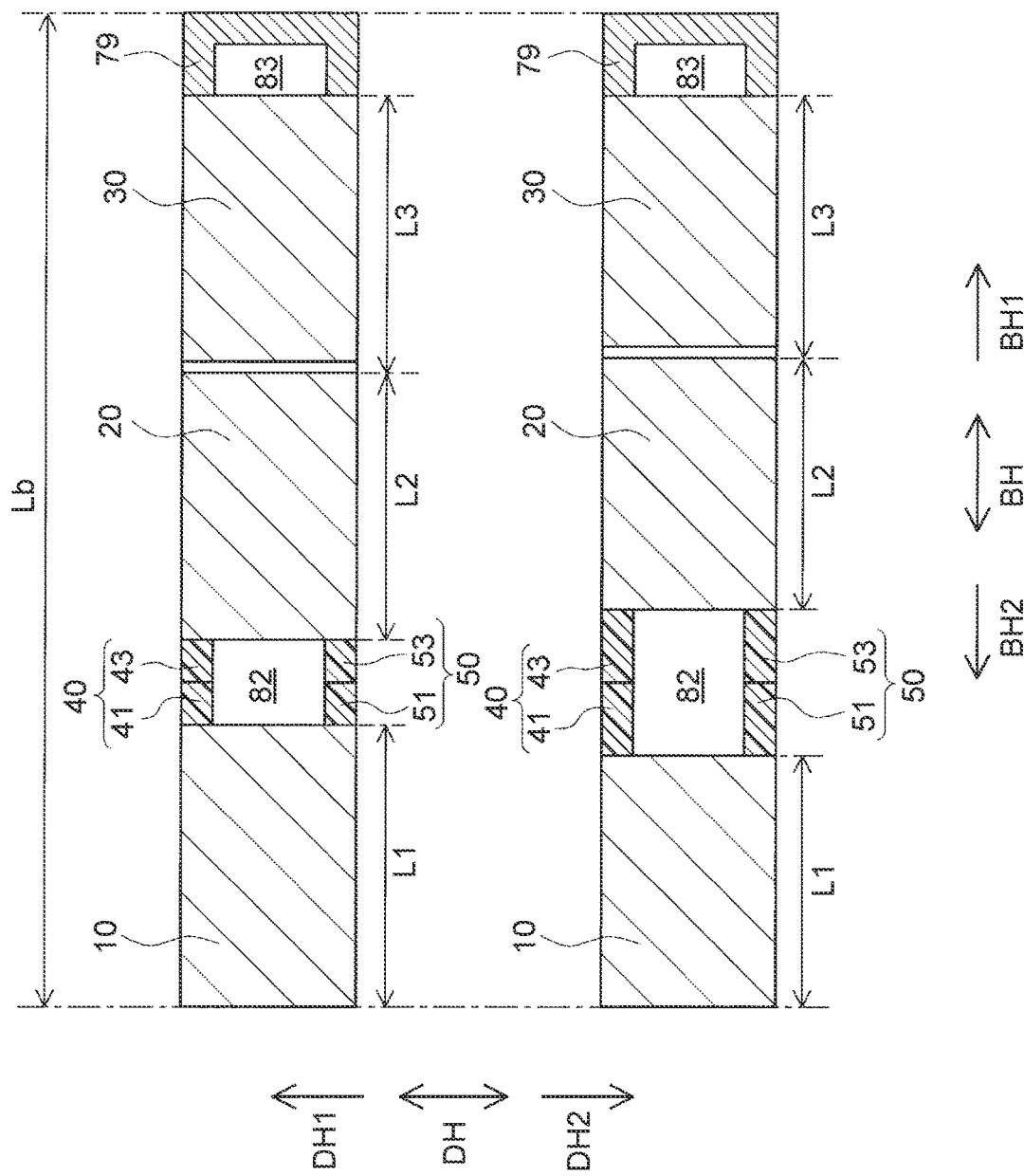
FIG. 10 is a view relating to the second module block according to the embodiment, illustrating how dimensional variations in the dimension in the first direction among the first battery modules, the second battery modules, and the third battery modules are absorbed as the one-side wall and the other-side wall expand and contract.

As described above, there are dimensional variations among the first battery modules 10 in the dimension L1 in the width direction, and among the second battery modules 20 in the dimension L2 in the width direction (see FIG. 10). There are also dimensional variations among the third battery modules 30 in a dimension L3 in the width direction (a dimension in the first direction; a dimension in the array direction). In an upper part of FIG. 10, a first battery module 10, a second battery module 20, and a third battery module 30 having relatively large dimensions L1, L2, L3 in the width direction are shown, and in a lower part of FIG. 10, a first battery module 10, a second battery module 20, and a third battery module 30 having relatively small dimensions L1, L2, L3 in the width direction are shown.

However, as described above, the upper wall 40 and the lower wall 50 are each made of the sponge-like resin material and able to expand and contract in the width direction BH. Therefore, the dimensional variations in the dimensions L1, L2, L3 in the width direction among the battery modules 10, 20, 30 can be absorbed by the amount of contraction of the upper wall 40 and the lower wall 50. This makes it possible to set the dimension Lb of the second module block 7 in the width direction to a constant value without dimensional variations, as shown in FIG. 10.

As has been described above, in the battery pack 1, the upper wall 40 and the lower wall 50 are provided in each of the first module block 5 and the second module block 7, between the first air intake surface 10a of the first battery module 10 and the second air intake surface 20a of the second battery module 20, to seal the cooling air flow passage chambers 81, 82 from the height direction DH (the upper side DH1 and the lower side DH2). Since the upper wall 40 and the lower wall 50 are formed so as to be able to expand and contract in the width direction BH, any dimensional variations in the dimensions L1, L2 in the width direction among the first battery modules 10 or among the second battery modules 20 can be absorbed as the upper wall 40 and the lower wall 50 expand and contract. It is therefore possible to reduce the dimensional variations in the dimensions La, Lb in the width direction among the first module blocks 5 and among the second module blocks 7.

Moreover, in this embodiment, the part of the upper wall 40 and the part of the lower wall 50 (the first upper wall part 41 and the first lower wall part 51) are integrally provided in the first battery module 10, and the rest of the upper wall 40 and the rest of the lower wall 50 (the second upper wall part 43 and the second lower wall part 53) are integrally provided in the second battery module 20. Thus, compared with when the upper wall 40 and the lower wall 50 are formed as parts separate from the first battery module 10 and the second battery module 20, these battery modules can be easily installed onto the battery pack 1, which contributes to making the battery pack 1 inexpensive.

Figure 14:
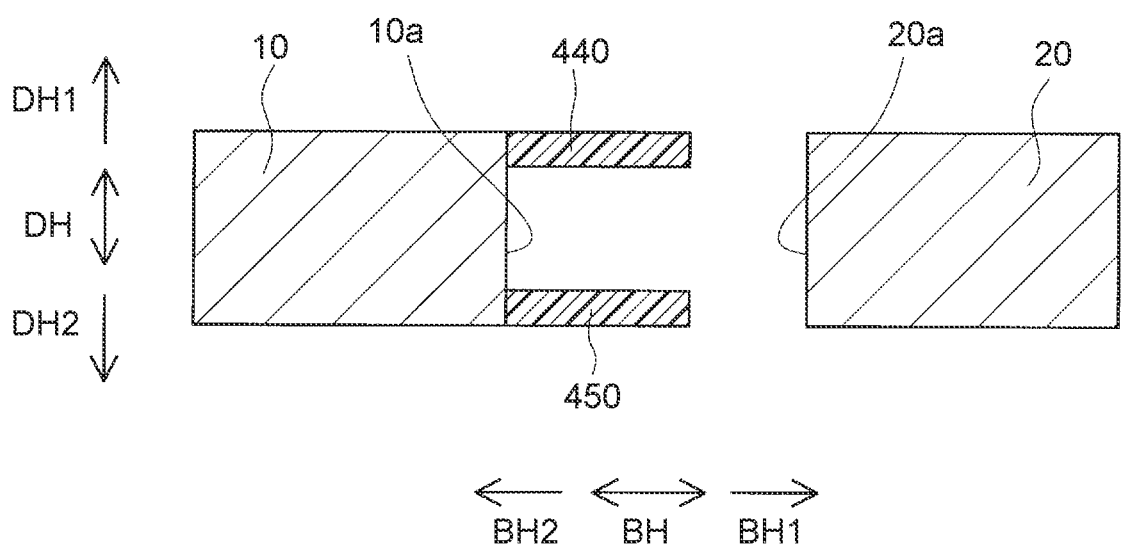
FIG. 14 is a view illustrating the configuration of a one-side wall and an other-side wall according to Modified Example 4.
Figure 15:
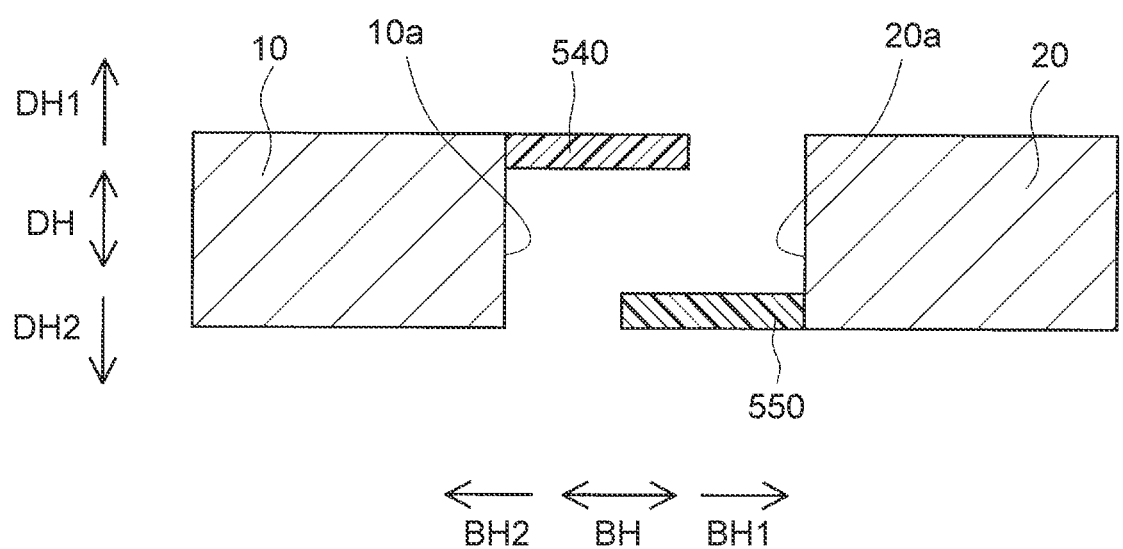
FIG. 15 is a view illustrating the configuration of a one-side wall and an other-side wall according to Modified Example 5.

If the upper wall 40 is provided in only either the first battery module 10 or the second battery module 20, and the lower wall 50 is provided in only either the first battery module 10 or the second battery module 20 (see FIG. 14 and FIG. 15 to be described later), the amount of projection of the upper wall 40 or the lower wall 50 projecting in the width direction BH from the first battery module 10 or the second battery module 20 becomes large. In this embodiment, by contrast, the upper wall 40 and the lower wall 50 are provided in both the first battery module 10 and the second battery module 20 by being halved into the first and second upper wall parts 41, 43 and the first and second lower wall parts 51, 53, respectively. Thus, the amount of projection of the first upper wall part 41 and the first lower wall part 51 projecting in the width direction BH from the first battery module 10 can be made smaller (the lengths of these wall parts can be halved), and the amount of projection of the second upper wall part 43 and the second lower wall part 53 projecting in the width direction BH from the second battery module 20 can be made smaller (the lengths of these wall parts can be halved). This allows the first battery module 10 and the second battery module 20 to be easily installed onto the battery pack 1, which contributes to making the battery pack 1 inexpensive.

In this embodiment, the upper wall 40 (the first upper wall part 41 and the second upper wall part 43) and the lower wall 50 (the first lower wall part 51 and the second lower wall part 53) are each entirely made of the sponge-like resin material. Therefore, dimensional variations in the dimensions L1, L2 in the width direction occurring among the first battery modules 10 or among the second battery modules 20 can be appropriately absorbed as the sponge-like resin material composing the upper wall 40 and the lower wall 50 expands and contracts. Moreover, the upper wall 40 and the lower wall 50 can be formed inexpensively, which contributes to making the battery pack 1 inexpensive.

In this embodiment, the connector members 61, 71 are provided on the front side CH1 of the cooling air flow passage chambers 81, 82. By attaching the air pipes 91, 92 to these connector members 61, 71, the cooling air RC can be easily supplied into the cooling air flow passage chambers 81, 82 so as to flow from the front side CH1 toward the rear side CH2. On the other hand, the closure walls 66, 76 are provided on the rear side CH2 of the cooling air flow passage chambers 81, 82. Thus, the cooling air RC inside the cooling air flow passage chambers 81, 82 can be prevented from flowing out toward the rear side CH2, and the batteries 3 inside the first battery modules 10 and the second battery modules 20 can be cooled more appropriately.

Modified Example 1

Figure 11:
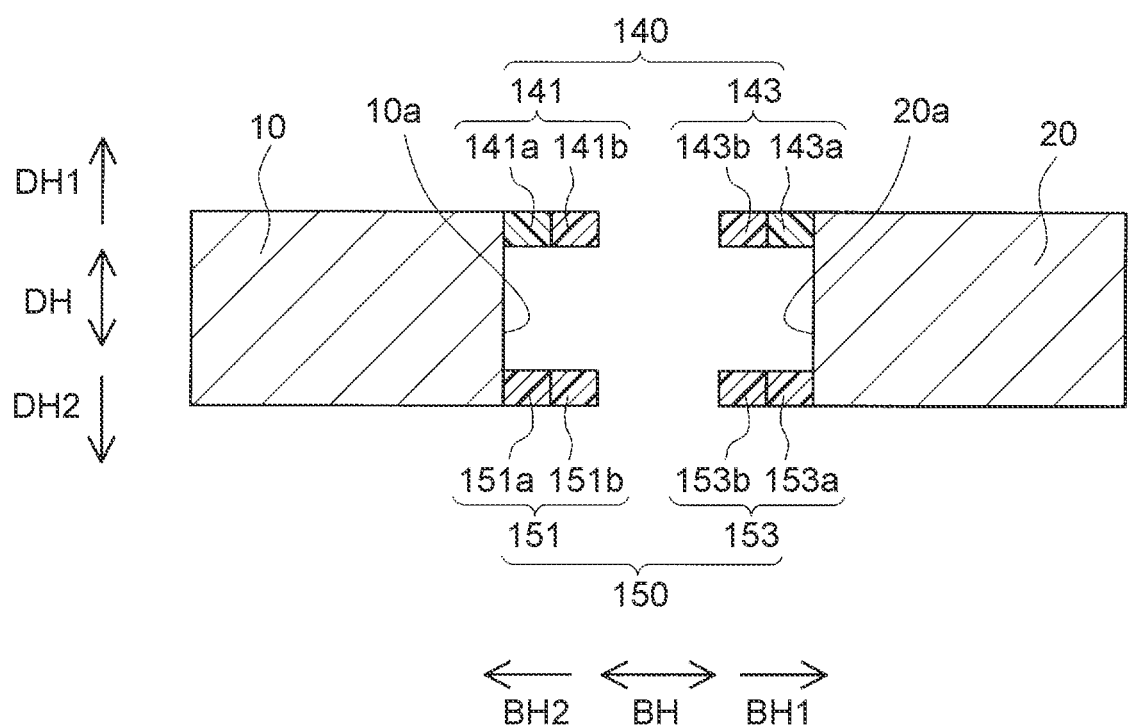
FIG. 11 is a view illustrating the configuration of a one-side wall and an other-side wall according to Modified Example 1.

Next, Modified Example 1 of the above embodiment will be described (see FIG. 11). The upper wall 40 and the lower wall 50 according to the embodiment are able to expand and contract in the width direction BH by being entirely made of the sponge-like resin material. The part (the first upper wall part 41) of the upper wall 40 and the part (the first lower wall part 51) of the lower wall 50 are integrally provided in the first battery module 10, and the rest (the second upper wall part 43) of the upper wall 40 and the rest (the second lower wall part 53) of the lower wall 50 are integrally provided in the second battery module 20.

By contrast, in an upper wall 140 and a lower wall 150 of Modified Example 1, of a first upper wall part 141 provided in the first battery module 10, only a leading end portion 141b is made of the sponge-like resin material, while a base end portion 141a joined to the leading end portion 141b is made of a resin that does not expand or contract. Similarly, of a first lower wall part 151 provided in the first battery module 10, only a leading end portion 151b is made of the sponge-like resin material, while a base end portion 151a joined to the leading end portion 151b is made of a resin that does not expand or contract. Of a second upper wall part 143 provided in the second battery module 20, only a leading end portion 143b is made of the sponge-like resin material, while a base end portion 143a joined to the leading end portion 143b is made of a resin that does not expand or contract.

Similarly, of a second lower wall part 153 provided in the second battery module 20, only a leading end portion 153*b* is made of the sponge-like resin material, while a base end portion 153*a* joined to the leading end portion 153*b* is made of a resin that does not expand or contract.

Since the portions (the leading end portions 141*b*, 143*b*) of the first upper wall part 141 and the second upper wall part 143 of Modified Example 1 are able to expand and contract in the width direction BH, each of the first upper wall part 141 and the second upper wall part 143, and further the upper wall 140, as a whole is able to expand and contract in the width direction BH. Moreover, since the portions (the leading end portions 151*b*, 153*b*) of the first lower wall part 151 and the second lower wall part 153 are able to expand and contract in the width direction BH, each of the first lower wall part 151 and the second lower wall part 153, and further the lower wall 150, as a whole is able to expand and contract in the width direction BH. Thus, the upper wall 140 and the lower wall 150 of Modified Example 1 can also reduce the dimensional variations in the dimensions La, Lb in the width direction among the first module blocks 5 and among the second module blocks 7.

Modified Example 2

Figure 12:
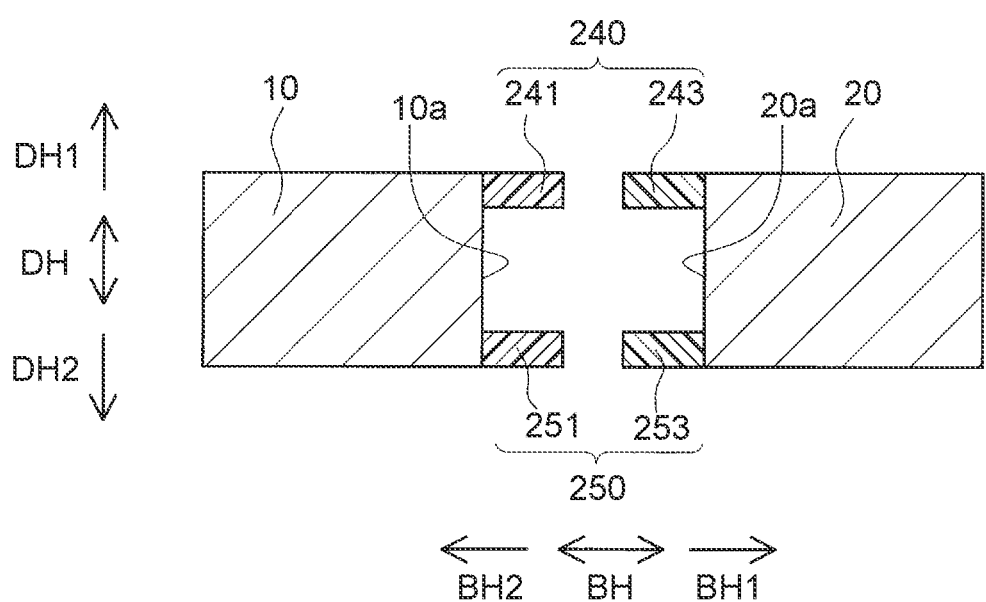
FIG. 12 is a view illustrating the configuration of a one-side wall and an other-side wall according to Modified Example 2.

Next, Modified Example 2 will be described (see FIG. 12). Of an upper wall 240 of Modified Example 2, only a first upper wall part 241 provided in the first battery module 10 is made of the sponge-like resin material, while a second upper wall part 243 provided in the second battery module 20 is made of a resin that does not expand or contract. Of a lower wall 250 of Modified Example 2, only a first lower wall part 251 provided in the first battery module 10 is made of the sponge-like resin material, while a second lower wall part 253 provided in the second battery module 20 is made of a resin that does not expand or contract.

In Modified Example 2, since the first upper wall part 241 is able to expand and contract in the width direction BH, the upper wall 240 as a whole is also able to expand and contract in the width direction BH. Moreover, since the first lower wall part 251 is able to expand and contract in the width direction BH, the lower wall 250 as a whole is also able to expand and contract in the width direction BH. Thus, the upper wall 240 and the lower wall 250 of Modified Example 2 can also reduce the dimensional variations in the dimensions La, Lb in the width direction among the first module blocks 5 and among the second module blocks 7.

Modified Example 3

Figure 13:
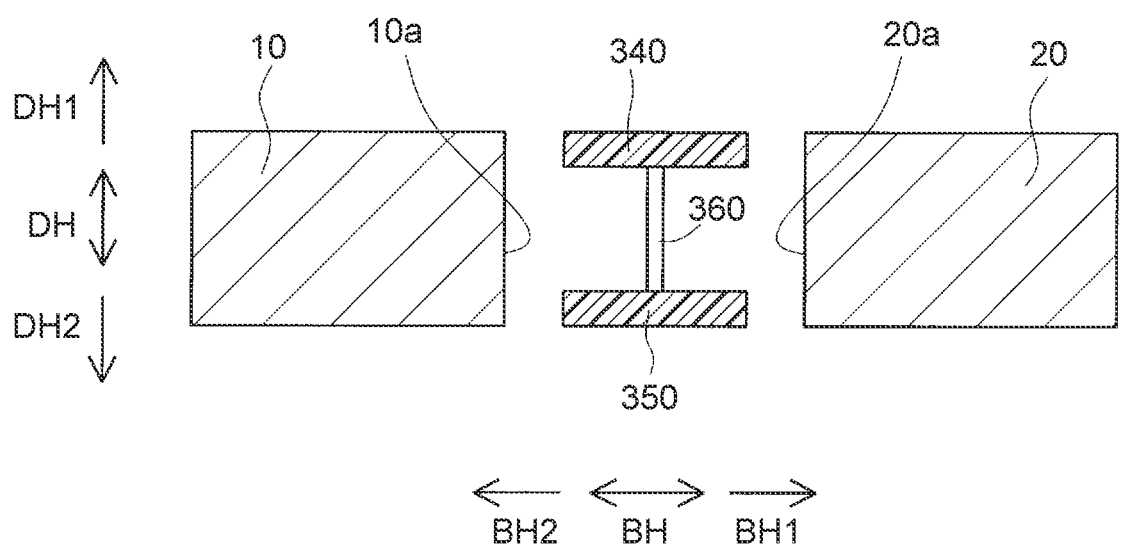
FIG. 13 is a view illustrating the configuration of a one-side wall and an other-side wall according to Modified Example 3.

Next, Modified Example 3 will be described (see FIG. 13). An upper wall 340 and a lower wall 350 of Modified Example 3 are formed as parts separate from the first battery module 10 and the second battery module 20. Specifically, the upper wall 340 and the lower wall 350 are connected to each other by a plurality of columnar members 360 that extends in the height direction DH and is arrayed in the depth direction CH. The upper wall 340 and the lower wall 350 are entirely made of the sponge-like resin material. Also in Modified Example 3, since the upper wall 340 and the lower wall 350 are able to expand and contract in the width direction BH, dimensional variations in the dimensions La, Lb in the width direction among the first module blocks 5 and among the second module blocks 7 can be reduced.

Modified Examples 4 and 5

Next, Modified Example 4 (see FIG. 14) and Modified Example 5 (see FIG. 15) will be described. In Modified Example 4, an upper wall 440 and a lower wall 450 are provided in only the first battery module 10. On the other hand, in Modified Example 5, an upper wall 540 is provided in only the first battery module 10, and a lower wall 550 is provided in only the second battery module 20. The upper walls 440, 540 and the lower walls 450, 550 of Modified Examples 4, 5 are entirely made of the sponge-like resin material. Also in Modified Examples 4 and 5, since the upper walls 440, 540 and the lower walls 450, 550 are able to expand and contract in the width direction BH, dimensional variations in the dimensions La, Lb in the width direction among the first module blocks 5 and among the second module blocks 7 can be reduced.

While the present disclosure has been described above based on the embodiment, it should be understood that the present disclosure is not limited to this embodiment and Modified Examples 1 to 5 but can be applied with changes appropriately made thereto within the scope of the gist of the disclosure.

What is claimed is:

1. A battery pack including a plurality of battery modules each having a plurality of batteries, the battery pack comprising:

a first battery module with a rectangular parallelepiped outer shape that has a first air intake surface which faces one side in a first direction and extends in a second direction orthogonal to the first direction and through which cooling air is taken into the module; and a second battery module with a rectangular parallelepiped outer shape that is disposed on the one side of the first battery module in the first direction, next to the first battery module, and has a second air intake surface which is opposite to the first air intake surface, faces the other side in the first direction, and extends in the second direction and through which the cooling air is taken into the module, wherein, between the first air intake surface of the first battery module and the second air intake surface of the second battery module, a cooling air flow passage chamber is formed which extends in the second direction along the first air intake surface and the second air intake surface and in which the cooling air flows from one side toward the other side in the second direction while flowing into the first battery module through the first air intake surface and flowing into the second battery module through the second air intake surface, wherein the battery pack includes:

a one-side wall that is interposed between the first air intake surface of the first battery module and the second air intake surface of the second battery module, extends in the second direction, and seals the cooling air flow passage chamber from one side in a third direction orthogonal to both the first direction and the second direction; and an other-side wall that is interposed between the first air intake surface of the first battery module and the second air intake surface of the second battery module, extends in the second direction, is opposite to the one-side wall, and seals the cooling air flow passage chamber from the other side in the third direction, wherein the one-side wall and the other-side wall are made of a material that is different from remaining parts of the first and second battery modules, and wherein the one-side wall and the other-side wall are formed so as to be able to expand and contract in the first direction while maintaining the cooling air flow passage chamber in a sealed state, wherein the one-side wall is at least partially made of a sponge-like resin material so as to be able to expand and contract in the first direction, and the other-side wall is at least partially made of a sponge-like resin material so as to be able to expand and contract in the first direction, wherein:

the one-side wall forms an upper wall of the cooling air flow passage chamber, and the upper wall includes a first part made of the sponge-like material, and a second part made of a resin that does not expand or contract, and the other-side wall forms a lower wall of the cooling air flow passage chamber, and the lower wall includes a first part made of the sponge-like material, and a second part that does not expand or contract.

2. The battery pack according to claim 1, comprising:
a connector which seals the cooling air flow passage chamber from the one side in the second direction and communicates with the cooling air flow passage chamber and to which an air pipe that discharges the cooling air is attached; and
a closure wall that seals the cooling air flow passage chamber from the other side in the second direction.

3. A battery pack including a plurality of battery modules each having a plurality of batteries, the battery pack comprising:
a first battery module with a rectangular parallelepiped outer shape that has a first air intake surface which faces one side in a first direction and extends in a second direction orthogonal to the first direction and through which cooling air is taken into the module; and
a second battery module with a rectangular parallelepiped outer shape that is disposed on the one side of the first battery module in the first direction, next to the first battery module, and has a second air intake surface which is opposite to the first air intake surface, faces the other side in the first direction, and extends in the second direction and through which the cooling air is taken into the module,
wherein, between the first air intake surface of the first battery module and the second air intake surface of the second battery module, a cooling air flow passage chamber is formed which extends in the second direction along the first air intake surface and the second air intake surface and in which the cooling air flows from one side toward the other side in the second direction while flowing into the first battery module through the first air intake surface and flowing into the second battery module through the second air intake surface,
wherein the battery pack includes:
a one-side wall that is interposed between the first air intake surface of the first battery module and the second air intake surface of the second battery module, extends in the second direction, and seals the cooling air flow passage chamber from one side in a third direction orthogonal to both the first direction and the second direction; and
an other-side wall that is interposed between the first air intake surface of the first battery module and the second air intake surface of the second battery module, extends in the second direction, is opposite to the one-side wall, and seals the cooling air flow passage chamber from the other side in the third direction,
wherein the one-side wall and the other-side wall are made of a material that is different from remaining parts of the first and second battery modules, and wherein the one-side wall and the other-side wall are formed so as to be able to expand and contract in the first direction while maintaining the cooling air flow passage chamber in a sealed state, wherein the one-side wall is at least partially made of a sponge-like resin material so as to be able to expand and contract in the first direction, and the other-side wall is at least partially made of a sponge-like resin material so as to be able to expand and contract in the first direction, wherein the one-side wall forms an upper wall and the other-side wall forms a lower wall of the cooling air flow passage chamber, wherein the upper wall and the lower wall are entirely made of the sponge-like material, and the upper wall and the lower wall are formed separate from the first battery module and the second battery module, and wherein the upper wall is connected to the lower wall by a plurality of columnar members.

4. The battery pack according to claim 3, comprising:
a connector which seals the cooling air flow passage chamber from the one side in the second direction and communicates with the cooling air flow passage chamber and to which an air pipe that discharges the cooling air is attached; and
a closure wall that seals the cooling air flow passage chamber from the other side in the second direction.

5. A battery pack including a plurality of battery modules each having a plurality of batteries, the battery pack comprising:
a first battery module with a rectangular parallelepiped outer shape that has a first air intake surface which faces one side in a first direction and extends in a second direction orthogonal to the first direction and through which cooling air is taken into the module; and
a second battery module with a rectangular parallelepiped outer shape that is disposed on the one side of the first battery module in the first direction, next to the first battery module, and has a second air intake surface which is opposite to the first air intake surface, faces the other side in the first direction, and extends in the second direction and through which the cooling air is taken into the module,
wherein, between the first air intake surface of the first battery module and the second air intake surface of the second battery module, a cooling air flow passage chamber is formed which extends in the second direction along the first air intake surface and the second air intake surface and in which the cooling air flows from one side toward the other side in the second direction while flowing into the first battery module through the first air intake surface and flowing into the second battery module through the second air intake surface,
wherein the battery pack includes:
a one-side wall that is interposed between the first air intake surface of the first battery module and the second air intake surface of the second battery module, extends in the second direction, and seals the cooling air flow passage chamber from one side in a third direction orthogonal to both the first direction and the second direction; and
an other-side wall that is interposed between the first air intake surface of the first battery module and the second air intake surface of the second battery module, extends in the second direction, is opposite to the one-side wall, and seals the cooling air flow passage chamber from the other side in the third direction, wherein the one-side wall and the other-side wall are made of a material that is different from remaining parts of the first and second battery modules, and wherein the one-side wall and the other-side wall are formed so as to be able to expand and contract in the first direction while maintaining the cooling air flow passage chamber in a sealed state, wherein the one-side wall is at least partially made of a sponge-like resin material so as to be able to expand and contract in the first direction, and the other-side wall is at least partially made of a sponge-like resin material so as to be able to expand and contract in the first direction, wherein the one-side wall and the other-side wall are joined to the first battery module without being joined to the second battery module, wherein the one-side wall and the other-side wall are entirely made of the sponge-like material.

6. The battery pack according to claim 5, comprising:
a connector which seals the cooling air flow passage chamber from the one side in the second direction and communicates with the cooling air flow passage chamber and to which an air pipe that discharges the cooling air is attached; and
a closure wall that seals the cooling air flow passage chamber from the other side in the second direction.

* * * * *